United States Patent [19]

Hashimoto

[11] Patent Number: 4,623,903

[45] Date of Patent: Nov. 18, 1986

[54] THERMAL HEAD

[75] Inventor: Kenichiro Hashimoto, Kawasaki, Japan

[73] Assignee: Canon Kabushiki Kaisha, Tokyo, Japan

[21] Appl. No.: 712,025

[22] Filed: Mar. 15, 1985

[30] Foreign Application Priority Data

Mar. 22, 1984 [JP] Japan .................................. 59-55331

[51] Int. Cl.[4] .............................................. G01D 15/10

[52] U.S. Cl. ........................... 346/76 PH; 346/139 C; 219/543; 400/120

[58] Field of Search ............ 346/76 PH, 76 R, 139 C; 219/216 PH, 543; 400/120; 250/317.1, 318

[56] References Cited

U.S. PATENT DOCUMENTS 4,251,822 2/1981 Hara et al. ...................... 346/76 PH 4,491,853 6/1985 Hayashi et al. ................ 346/76 PH

FOREIGN PATENT DOCUMENTS 0212970 12/1983 Japan .............................. 346/76 PH 0011262 1/1984 Japan ................................... 400/120

*Primary Examiner*—A. Evans

*Attorney, Agent, or Firm*—Fitzpatrick, Cella, Harper & Scinto

[57] ABSTRACT

An auxiliary heating element is provided near at least one end of an array of main heating resistor elements, thereby preventing thermal diffusion near the at least one end of the array and providing uniform printing density and prolonged service life. The adjacent portion of the auxiliary heating resistor element and the main heating resistor elements may be connected in series or in parallel, thereby simplifying the feeder pattern to the heating resistor elements, hence simplifying the structure of connectors and a drive circuit concerned, providing uniform image density and realizing prolonged service life of thermal head, without raising cost.

27 Claims, 5 Drawing Figures

THERMAL HEAD

BACKGROUND OF THE INVENTION

1. Field of the Invention

The present invention relates to a thermal head which provides uniform density in an image portion near an end of an array of heating resistor elements.

2. Description of the Prior Art

A conventional thermal head is shown in FIG. 1. In the figure, reference characters $D_1, D_2, \ldots D_7$ respectively denote heating resistor elements; C, a common feeder pattern to the respective heating elements; $L_1, L_2, \ldots L_7$, individual feeder patterns to the respective heating elements. Reference numeral 1 denotes a whole thermal head which includes the respective heating resistor elements and the feeder patterns. In such thermal head, a source power is applied across the common feeder pattern C and each of the individual feeder patterns $L_1, L_2, \ldots L_7$ to cause the resistor elements $D_1, D_2, \ldots D_7$ to generate heat, thereby coloring heat-sensitive paper (not shown) for thermal printing.

Both end elements $D_1$, $D_7$ of these resistor elements $D_1$ to $D_7$ produce light printing density and have short service life compared to the inner elements $D_2$ to $D_6$. This is mainly because the inner heating resistor elements $D_2$ to $D_6$ each have a heating resistor element at each end thereof which generates heat, thereby reducing thermal diffusion from the inner elements $D_2$ to $D_6$ toward the respective adjacent end elements whereas the end elements $D_1$, $D_7$ each have heating resistors only on one side, so that heat will diffuse in the direction in which there are no heating resistor elements. For example, when the second heating resistor element $D_2$ generates heat, this heat is difficult to diffuse toward the resistor elements $D_1$, $D_3$ and to diffuse toward the feeder patterns C, $L_2$ on either side of the element $D_2$ (in the respective directions A and B). In comparison with this, the upper end heating resistor element $D_1$, generates heat which further diffuses in the X direction. Similarly, heat from the lower end heating resistor element $D_7$ diffuses in the Y direction. If thermal diffusion is severe as described above, the upper and lower end elements provide a clearly degraded printing density, and have rapid temperature rise and fall curves, which can shorten their service life. As a potential solution to these problems, the inventor conceives that unillustrated auxiliary heating resistor elements (the same structure as, or quite different in resistance from, the main heating resistor elements) could be provided separately at the upper and lower ends of the main heating resistor elements $D_1, D_2, \ldots D_7$ to prevent upward and downward heat diffusion from the main upper and lower end heating resistor elements, when the power is applied to the upper and lower ends of the main heating resistor elements. Furthermore, energy in an amount which hardly creates color could be applied to the auxiliary heating resistor elements, thereby providing uniform printing density and prolonged service life.

According to this method, however, additional output lines $l_0$, $l_8$ are required for driving the above auxiliary heating resistor elements in the schematic connection diagram of FIG. 2. This leads to enlarged dimension and raised cost of the thermal head due to an increase in the number of feeder patterns, raised cost due to an increase in the number of pins in the connector CN1 for connecting the drive circuit DC1 with the thermal head 1, and complication of the electric circuit and drive method concerned due to the necessity of using two kinds of heat pulse.

SUMMARY OF THE INVENTION

It is a first object of the present invention to provide a uniform printing density in a pictorial image, which is recorded by a thermal head, in the vicinity of an end of the thermal head.

It is a second object of the present invention to reduce changes in the temperature of a thermal head for prolonging the service life of the thermal head.

It is a third object of the present invention to simplify the structure of a thermal head without increasing the number of electrodes thereof for reducing cost without casting any additional burdens on the connectors and the electric circuit connected to the thermal head, and software, etc.

DESCRIPTION OF THE PREFERRED EMBODIMENT

Figure 2:
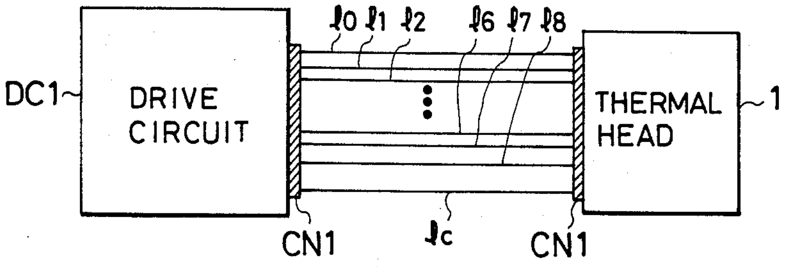
FIG. 2 PRIOR ART
FIG. 2 is a schematic diagram of a connection for driving the conventional thermal head.
Figure 3:
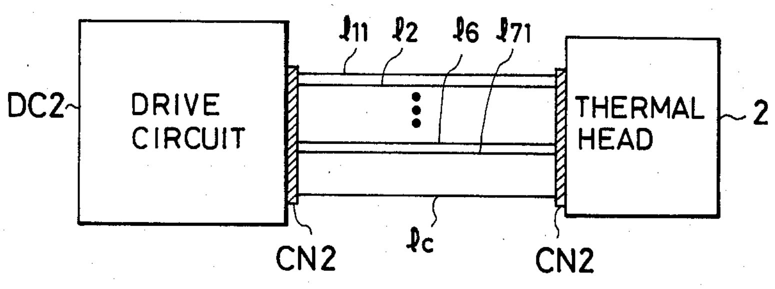
FIG. 3 is a schematic diagram of a connection for driving a thermal head according to the present invention.

FIG. 3 is a schematic diagram of a connection for driving a thermal head according to the present invention. In comparison with the conventional connection diagram of FIG. 2, it is noted that no output lines $l_0$, $l_8$ are needed which connect the auxiliary heating resistor elements to the power feed patterns.

Figure 4:
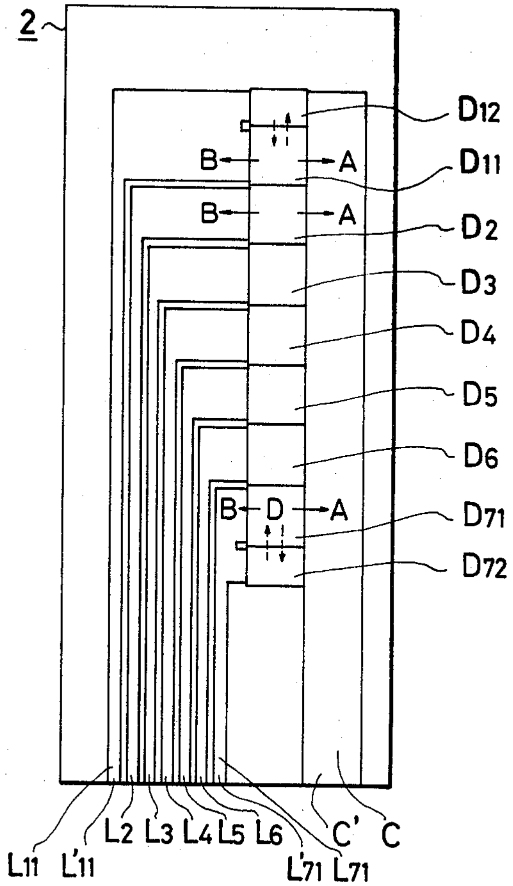
FIG. 4 is a front view of a first embodiment of the thermal head according to the present invention.

In FIG. 3, output lines $l_{11}$, $l_2$ to $l_6$, $l_{71}$ and $l_c$ are connected to feeder patterns $L_{11}$, $L_2$ to $L_6$, $L_{71}$ and C, respectively, of the thermal head, as shown in FIG. 4.

Connectors CN2 which connect drive circuit DC2 with thermal head 2 may remove pins corresponding to output lines $l_0$, $l_8$ as compared with the connectors CN1 of FIG. 2.

The structure of the drive circuit DC2 may be simplified because the number of output lines of the drive circuit DC2 is fewer than that of the drive circuit DC1.

FIG. 4 illustrates a first embodiment of the present invention wherein the same structures as the prior art ones are designated by the same reference character or numeral. Reference character $D_{11}, D_2, D_3, \ldots D_6, D_{71}$ denote main heating resistor elements: $D_{12}$ and $D_{22}$, auxiliary heating resistor elements respectively connected in parallel with the main elements $D_{11}$ and $D_{71}$; C, a common feeder pattern to the heating resistor elements: $L_{11}, L_2, L_3, \ldots L_6, L_{71}$, individual feeder patterns to corresponding heating resistor elements; and reference numeral 2 denotes a whole thermal head which carries the respective heating resistor elements and the feeder patterns.

The main heating resistor elements $D_{11}$ to $D_{71}$ and the auxiliary heating resistor elements $D_{12}$, and $D_{72}$ are arranged in a substantially straight line along the longitudinal direction of the thermal head 2. The auxiliary heating resistor elements $D_{12}$ and $D_{72}$ are positioned in the vicinity of either end of an array of the main heating resistor elements. They are smaller in size than the main elements, and may be formed at the same time when the thermal head 2 is formed using well-known thin and/or thick film techniques. The auxiliary element $D_{12}$ and the adjacent main element $D_{11}$ are connected at one end with a bifurcate portion of the individual feeder pattern $L_{11}$ and at the other end with the common feeder pattern C. On the other hand, the lower auxiliary element $D_{72}$ and the adjacent main element $D_{71}$ are connected at one end with a bifurcate portion of the individual feeder pattern $L_{71}$ and at the other end with the common feeder pattern C. Thus, the main and auxiliary elements $D_{11}$ and $D_{12}$ are electrically connected in parallel between the leading end $L'_{11}$ of the individual feeder pattern $L_{11}$ and the leading end C' of the common feeder pattern C. Similarly, the main and auxiliary elements $D_{71}$ and $D_{72}$ are eletrically connected in parallel between the leading end $L'_{71}$ of the individual feeder pattern $L_{71}$ and the leading end C' of the common feeder pattern C. The resistance values of the auxiliary elements $D_{12}$ and $D_{72}$ are set along with those of the main elements $D_{11}$ and $D_{71}$ so as not to color thermal sensitive paper and so as to prevent thermal diffusion of the main elements $D_{11}$ and $D_{71}$. As described above, the arrangement of the heating resistor elements according to the present invention is such that the auxiliary elements $D_{12}$ and $D_{72}$ are disposed respectively at the upper and lower ends of the main elements $D_{11}$ and $D_{71}$ in parallel connection therewith. Consequently, the upward and downward thermal diffusion from the main heating resistor elements $D_{11}$ and $D_{71}$ is suppressed by the heating of the auxiliary elements $D_{12}$ and $D_{72}$. Thus, the main elements $D_{11}$ and $D_{71}$ provide the same printing density and service life as the other main elements $D_2, D_3, \ldots D_6$ when the same feeder method is used for the $D_{11}$, $D_{71}$ and the $D_2, D_3 \ldots D_6$. Accordingly, no special control for driving the main elements $D_{11}$ and $D_{71}$ is needed and the electric circuit and the driving method therefor as they are can be used as in the prior art. Further, no feeder patterns increase in number, thereby inviting no raised cost.

Figure 1:
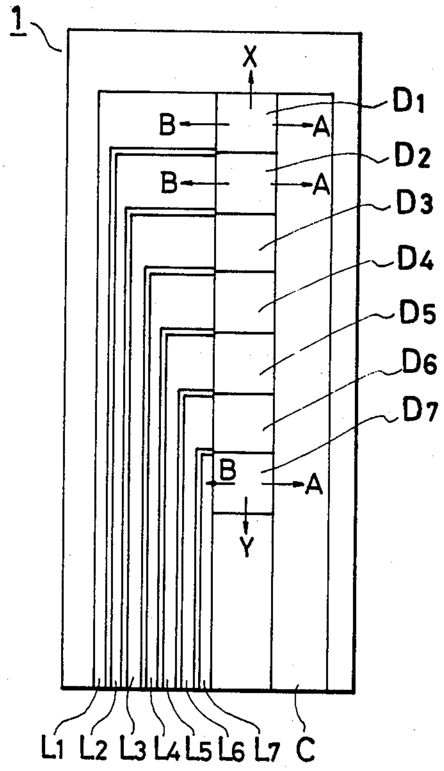
FIG. 1 PRIOR ART
FIG. 1 is a front view of a conventional thermal head.
Figure 5:
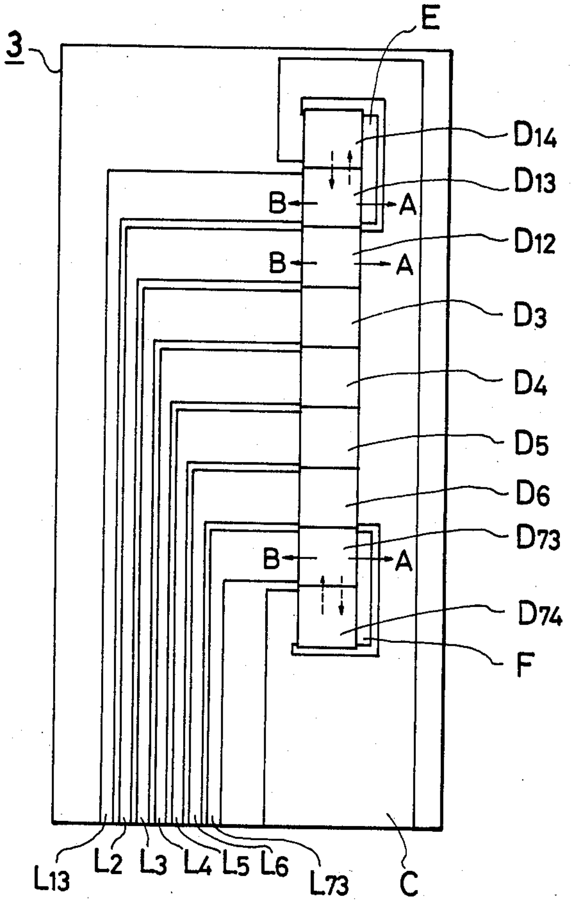
FIG. 5 is a front view of a second embodiment of the thermal head according to the present invention.

FIG. 5 illustrates the second embodiment of the present invention wherein the same parts as in FIGS. 1 and 4 are give the same reference characters or numerals. Reference characters $D_{13}, D_2, D_3, \ldots D_6, D_{73}$ denote an array of main heating resistor elements arranged in a substantially straight line. Reference characters $D_{14}$ and $D_{74}$ denote auxiliary heating resistor elements arranged adjacent to the main end elements $D_{13}$ and $D_{73}$ in the direction in which the array extends and electrically connected in series with resistor element connection patterns E and F. Reference character C denotes a common feeder pattern to the heating elements; $L_{13}, L_2, L_3, \ldots L_6, L_{73}$ individual feeder patterns to the respective heating resistor elements; and 3 the whole thermal head which carries the respective heating elements and feeder patterns. Such thermal head 3 can be formed like the first embodiment by substantially the same process as the conventional thermal head, using the well-known thin or thick film techniques. The auxiliary heating resistor elements $D_{14}$ and $D_{74}$ can be formed at the same time when the main heating resistor elements are formed.

The resistance values of the auxiliary elements $D_{14}$ and $D_{74}$ are set along with those of the main elements $D_{13}$ and $D_{73}$ such that the auxiliary elements $D_{14}$ and $D_{74}$ color no thermal sensitive paper and suppress thermal diffusion from the main elements $D_{13}$ and $D_{73}$. As described above, in the particular embodiment, since the heating elements are arranged such that auxiliary elements $D_{14}$ and $D_{74}$ are disposed above and below the upper and lower main elements $D_{13}$ and $D_{73}$, and connected in series with the elements $D_{13}$ and $D_{73}$, respectively, the upward and downward thermal diffusion from the main elements $D_{13}$ and $D_{73}$ is suppressed by the heating of the auxiliary elements $D_{14}$ and $D_{74}$ and the main elements $D_{13}$ and $D_{73}$ provide the same printing density and service life as the other main elements $D_2, D_3, \ldots D_6$, using the same feeder method as with the other main elements $D_2, D_3, \ldots D_6$. Thus, this embodiment also has the same effect as the first embodiment.

The present invention is not limited to the above embodiments. For example, although the embodiments are described as being applied to thermal heads which use thermal-sensitive paper, they may be applied to thermal transcription type thermal printers. An auxiliary heating resistor element does not need to be provided at each end of the array of the main heating resistor elements, but may be provided at one end of the array.

As described above, according to the present invention, an auxiliary heating resistor element is provided near one end of an array of main heating elements and is connected in parallel or series with the adjacent main element. Thus, the thermal head which provides uniform printing density and prolonged service life without increasing the number of feeder patterns and without changing the method of driving the electric circuit.

What is claimed is:

1. A thermal head for recording an image, comprising:

a plurality of main heating elements disposed in a row for producing heat by being provided with electricity to record an image;

one or more auxiliary heating elements each juxtaposed with a different one of said main heating elements at a respective end of said row, for producing heat by being provided with electricity to reduce heat diffusion from its respective said end main heating element; and connection means for electrically connecting each of said auxiliary heating elements to said respective end main heating element in series or in parallel.

2. A thermal head according to claim 1, further comprising a connector for connecting said thermal head to a drive circuit.

3. A thermal head according to claim 1, further comprising a power supply pattern for separately supplying power to said main heating elements.

4. A thermal head according to claim 1, wherein said main and auxiliary heating elements are substantially linearly disposed.

5. A thermal head according to claim 2, wherein said main and auxiliary heating elements are substantially linearly disposed.

6. A thermal head according to claim 3, wherein said main and auxiliary heating elements are substantially linearly disposed.

7. A thermal head according to claim 1, having at least two said auxiliary heating elements and wherein each of said auxiliary heating elements is juxtaposed with a different one of said main heating elements.

8. A thermal head according to claim 2, having at least two said auxiliary heating elements and wherein each of said auxiliary heating elements is juxtaposed with a different one of said end main heating elements.

9. A thermal head according to claim 3, having at least two of said auxiliary heating elements and wherein each of said auxiliary heating elements is juxtaposed with a different one of said end main heating elements.

10. A thermal head according to claim 1, wherein said auxiliary heating element is juxtaposed with either one of said end main heating elements.

11. A thermal head according to claim 2, wherein said auxiliary heating element is juxtaposed with either one of said end main heating elements.

12. A thermal head according to claim 3, wherein said auxiliary heating element is juxtaposed with either one of said end main heating elements.

13. A thermal head according to claim 1, wherein said auxiliary heating element does not directly contribute to image recording.

14. A thermal head according to claim 2, wherein said auxiliary heating element does not directly contribute to image recording.

15. A thermal head according to claim 3, wherein said auxiliary heating element does not directly contribute to image recording.

16. A thermal head according to claim 1, wherein said auxiliary heating element is smaller in area than each of said main heating elements.

17. A thermal head according to claim 2, wherein said auxiliary heating element is smaller in area than each of said main heating elements.

18. A thermal head according to claim 3, wherein said auxiliary heating element is smaller in area than each of said main heating elements.

19. A thermal head according to claim 1, wherein said auxiliary heating element is disposed close to said respective end main heating element.

20. A thermal head according to claim 2, wherein said auxiliary heating element is disposed close to said respective end main heating element.

21. A thermal head according to claim 3, wherein said auxiliary heating element is disposed close to said respective end main heating element.

22. A thermal head according to claim 1, further comprising a power supply pattern for supplying power commonly to said main and auxiliary heating elements.

23. A thermal head according to claim 1, wherein said main heating elements are arranged for recording an image on a recording medium and wherein said auxiliary heating elements are arranged so as not to record on the recording medium even when said main heating elements are recording thereon.

24. A thermal head for recording an image, comprising:

a plurality of main heating elements disposed in a row for producing heat by being provided with electricity to record an image;

one or more auxiliary heating elements each juxtaposed with a different one of said row of said main heating elements at an end of said row, for producing heat by being provided with electricity to reduce heat diffusion from its respective said end element;

common connection means for commonly and electrically connecting one side of each said main heating element to one side of each said auxiliary heating element; and connection means for electrically connecting the other side of each said element to the other side of the juxtaposed said auxiliary heating element in parallel.

25. A thermal head according to claim 24, wherein said main heating elements are arranged for recording an image on a recording medium and wherein said auxiliary heating elements are arranged so as not to record on the recording medium even when said main heating elements are recording thereon.

26. A thermal head for recording an image, comprising:

a plurality of main heating elements disposed in a row for producing heat by being provided with electricity to record an image;

one or more auxiliary heating elements each juxtaposed with a different one of said row of said main heating elements disposed at an end of said row, for producing heat by being provided with electricity to reduce heat diffusion from its respective said end element;

common connection means for commonly and electrically connecting one side of each said main heating element except said end elements to one side of each said auxiliary heating element;

respective connection means electrically connected to one side of each said end element; and connection means for electrically connecting the other side of each said end element to the other side of the juxtaposed said auxiliary heating element so that each said auxiliary heating element is connected in series between said common connection means and the respective juxtaposed said end element.

27. A thermal head according to claim 26, wherein said main heating elements are arranged for recording an image on a recording medium and wherein said auxiliary heating elements are arranged so as not to record on the recording medium even when said main heating elements are recording thereon.

* * * * *

UNITED STATES PATENT AND TRADEMARK OFFICE

CERTIFICATE OF CORRECTION

PATENT NO. : 4, 623,903

DATED : November 18, 1986

INVENTOR(S) : KENICHIRO HASHIMOTO

It is certified that error appears in the above-identified patent and that said Letters Patent is hereby corrected as shown below:

Column 1, line 47, "the inventor conceives that" should be deleted.

Column 4, line 28, "which" should be deleted.

Column 6, line 15, "said" should read --said end--.

Signed and Sealed this

Twenty-fourth Day of February, 1987

*Attest:*

DONALD J. QUIGG

*Attesting Officer*

*Commissioner of Patents and Trademarks*